Nov. 17, 1964 W. C. WAYNE, JR 3,157,725

SYSTEM FOR PROCESSING MUSICAL SPECTRA

Filed June 1, 1961

2 Sheets-Sheet 1

INVENTOR.
WILLIAM C. WAYNE, JR.
BY Hurvitz and Rose
ATTORNEYS

INVENTOR.
WILLIAM C. WAYNE, JR.
BY Hurvitz and Rose
ATTORNEYS 3,157,725

SYSTEM FOR PROCESSING MUSICAL SPECTRA

William C. Wayne, Jr., South Fort Mitchell, Ky., assignor to D. H. Baldwin Company, a corporation of Ohio Filed June 1, 1961, Ser. No. 114,078
13 Claims. (Cl. 84—1.24)

The present invention relates generally to systems for achieving chorus effect, glissando effect or frequency "slide," and reverberative effect in electronic organs, and other electrical musical instruments, and more particularly for achieving such effects selectively at will by processing an audio spectrum by means of a single-side-band, carrier-suppressed modulator or frequency-shift modulator having a feed-back connection between its output and input circuits.

The present application is a continuation-in-part of my application Serial No. 631,650, filed December 31, 1956, now U.S. Patent No. 3,004,060, and entitled Audio Modulator System, assigned to the same assignee as the present application.

In accordance with the present invention, one or more wide-band, single-side-band, carrier-suppressed modulators is employed (sometimes called frequency shift modulators), each of which continuously shifts the phases of all the frequencies of a wide band musical spectrum in a given sense, thereby producing a frequency shift of the entire spectrum in that sense. Different sub-bands of the spectrum may be shifted differently, and preferably higher frequency ones are caused to shift frequency by greater amounts. More specifically, different octaves of the wide band spectrum may be selected from the wide band outputs of several such modulators, each of which introduces different frequency shifts, by means of band pass filters designed to pass different octaval sub-bands of the wide band spectrum. The filtered sub-bands may be recombined, electrically or acoustically, to provide a processed wideband frequency spectrum.

According to the present invention a feed-back network is provided from the output to the input of a frequency shift modulator, the feed-back network being preferably arranged to provide a feed-back signal of amplitude smaller than the original signal. Assuming that a single frequency is inserted into the continuous phase changer, its frequency is shifted in a given direction, say upwardly, by some small amount, say 2 c.p.s. The original frequency, assumed to be F, thus acquires at the input of the frequency changer a companion frequency 2 c.p.s. higher, but of smaller amplitude, which we may denominate $F+\Delta f$. The latter frequency, in passing through the frequency shift modulator, suffers a further frequency shift upwardly by $\Delta f$. and is again reinserted into the phase changer to produce still a further shift of frequency by the same increment and in the same direction, but of still smaller amplitude. The feed-back signals are, for each traverse of the feed-back loop, smaller in amplitude than the original input signals, and in fact for the signals produced by the immediately preceding traverse, so that the process of generating new frequencies eventually terminates. On acoustically transducing the initial or final portion of a signal which is being processed as described herein, however, the effect produced is of a continuously shifting frequency band. If the shift is upward or sharp, a glissando Hawaiian guitar effect is achieved. If the shift is flat, a transient analogous to that provided by a pipe organ is provided. By inserting both flat and sharp effects simultaneously, average pitch is maintained constant, and reverberative effects achieved.

The modulating system contains no mechanically moving parts, but is all-electronic. It may be inserted in any electrical signal line containing program material to process the program material, whether the latter is derived from an electronic organ, a single manual, or a single stop, a moving picture sound track, a phonograph reproducer, a microphone, or the like.

More specifically describing a modulator, according to the invention, from a wide band audio spectrum are derived, by phase splitting, three components of identical frequency content and identical amplitudes, corresponding frequencies of which are displaced 120° in time phase. The phase-split components of the original signal are next amplitude modulated at a low frequency rate, each in response to one phase of a three phase sub-audible frequency oscillator, in such manner that upon linear recombination of the amplitude modulated signals a processed signal is obtained whose phase angle is continuously changed in a given sense relative to the input as a fixed reference value. By selecting the phase sequence of the low frequency oscillator outputs to be opposite to the phase sequence of the phased audio bands, the processed output will have a continuously varying phase shift in a positive or increasing sense, with a consequent increase in frequency. By reversing the relative phase sequences, the phase shift is in the opposite sense, i.e., the processed output will be "flat," or lower in frequency relative to the original input band.

If it is desired to maintain the frequency shift corresponding with any continuous phase variation at a selected constant percentage value, frequency shift of the entire audio band is accomplished in separate channels for separate sub-bands of the audio spectrum, and the modulation frequency selected for each channel is a fixed percentage of the center frequency of a desired sub-band. However, experience indicates that the selected percentage should decrease somewhat as the higher frequency sub-bands are approached to yield most pleasing musical results from widely varying input spectra encountered in practice.

Sub-bands are selected, from the several frequency shifted bands, which have the desired values of percentage frequency deviation, and the selected sub-bands are additively combined to re-form a processed audio frequency band.

Since the algebraic sign of the frequency shift, positive or negative, corresponds with the relative phase sequences adopted for the low frequency oscillator outputs and for the phase shifted spectra, in the modulation process, the sub-bands may have frequency deviations of either alegbraic sign at will. Although it may be desirable for systems set forth into the aforementioned patent application to derive sub-bands, adjacent ones of which are frequency shifted in *opposite* senses, it is preferred for the purposes of the present application to frequency shift all sub-bands in the *same* sense. It is further preferred that the sub-bands shall be of octaval width. On a statistical basis the same effect occurs in respect to partials, and where applicable the term harmonic may be taken to include partials, and vice versa to avoid repetitious language. Partials are components of tones which have frequencies that are not integral multiples of a fundamental frequency. They occur in piano and bell tones for example.

It is, accordingly, a broad object of the present invention to provide a system for enriching single frequencies by adding thereto spaced adjacent frequencies in time sequence.

It is another object of the invention to provide a system for shifting by plural increments and as a function of time all the frequencies of a band of frequencies.

It is still another object of the present invention to provide a system for achieving pitch variational effects in music by converting components of an audio spectrum to plural relatively displaced frequency positions, in sequence, the amplitudes of the displaced frequencies being reduced as a function of displacement.

It is still another object of the invention to provide a system for processing audio spectra representative of music, by generating plural spectra each of which is a duplicate frequency-wise of the original spectra, but in each of which frequency displaced spectra are reduced in amplitude as a function of displacement of frequencies from their original positions.

Still another object of the invention resides in a system for shifting frequency by means of a continuous phase changer or carrier-suppressed, single-side-band modulator, in which the output of the modulator is fed back to the input through a unilateral feed-back loop so as to regenerate frequency shifts.

A further object of the invention resides in the provision of a novel system for generating glissando effects in electronic music and more particularly at the terminations of sustained notes.

Another object of the invention resides in the provision of a novel system for introducing flat-going transients into electronic music, and more particularly at the terminations of sustained notes.

It is a further object of the invention to provide a system for electronically generating reverberation effects in electronic music.

It is a broad object of the invention to provide a system for modulating audio spectra by means of a single-side-band, frequency-shift modulator having feed-back between input and output circuits, and more particularly to systems of the specified character wherein the gain of the feed-back path is subject to control.

The above and still further objects, features and advantages of the present invention will become apparent upon consideration of the following detailed description of one specific embodiment thereof, especially when taken in conjunction with the accompanying drawings, wherein.

Figure 1:
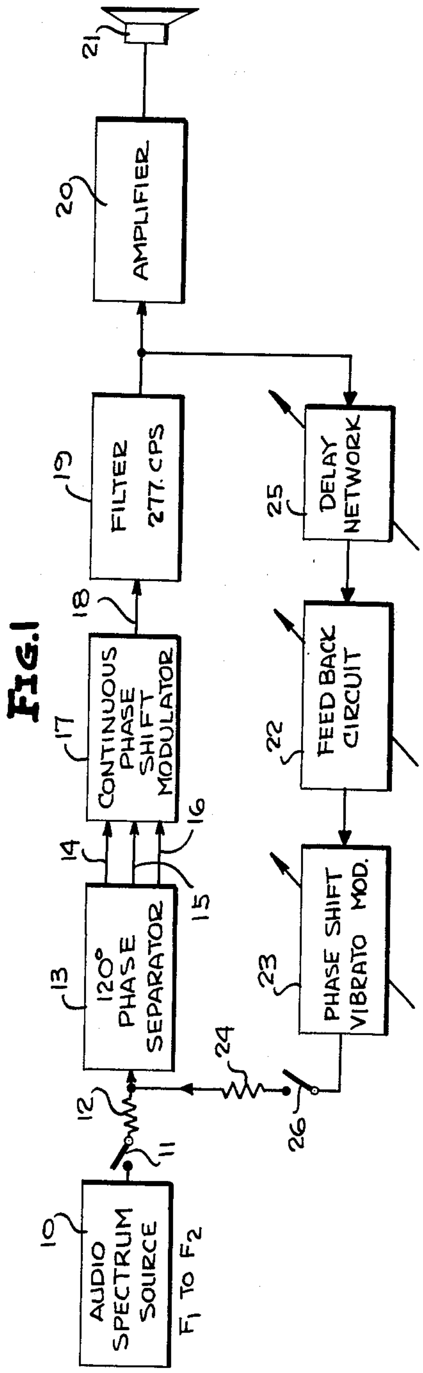
FIGURE 1 is a functional block diagram of a tone processing system according to the present invention.
Figures 3A, 3B, 3C, 3D, 3E, 3F, 3G:
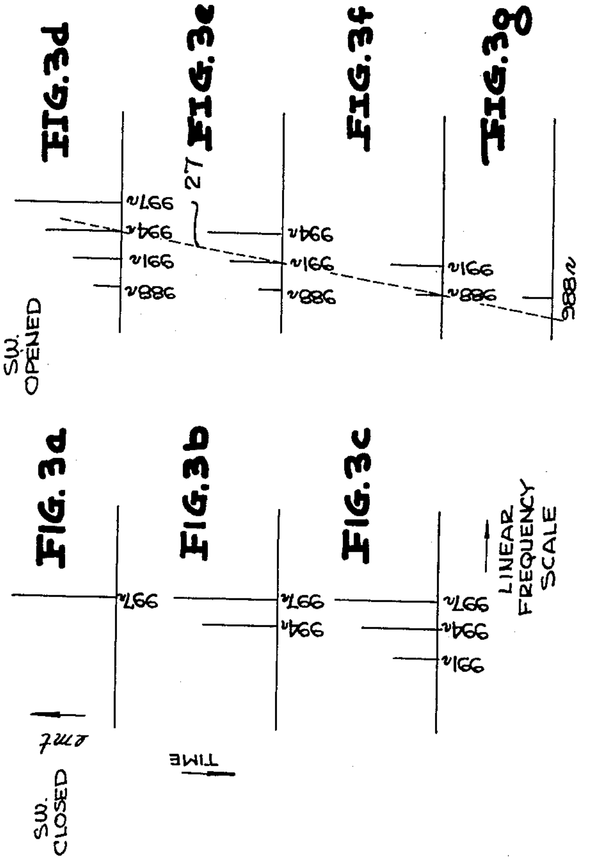
Figure 4:
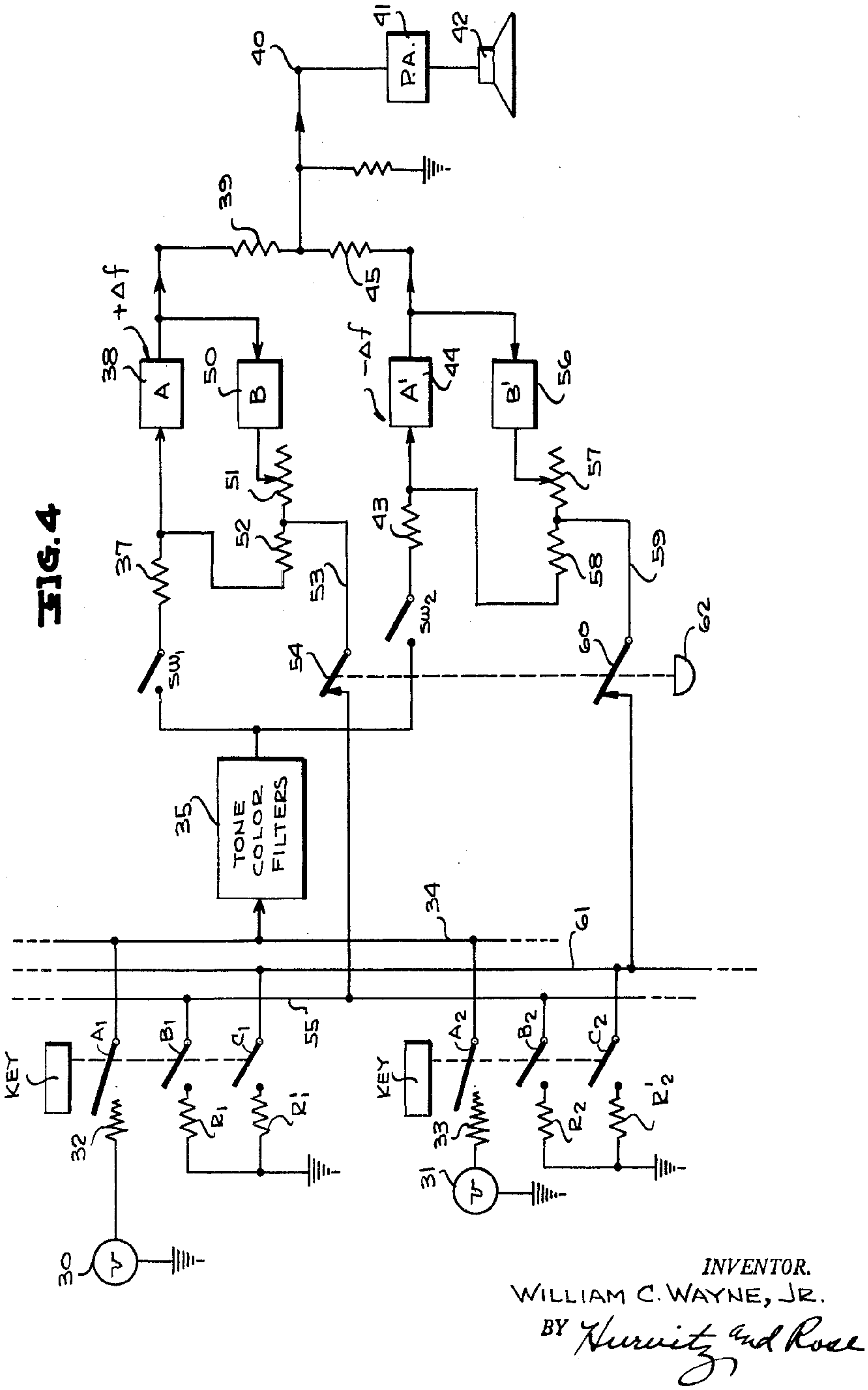

FIGURES 3*a* to 3*g* are time plots showing development and decay of frequencies, in the system of FIGURE 1; and FIGURE 4 is a block diagram of an organ system including the tone processing system of FIGURE 1, having provision for introducing glissando, flat going transients, reverberation effects and chorus effects, at will.

Referring now more specifically to FIGURE 1 of the accompanying drawings, the reference numeral 10 denotes an audio spectrum source, which in one specific embodiment of the invention may comprise the tone generators of an electronic organ, but which broadly may represent any audio spectrum source, such as a microphone, a sound track or the like.

The audio spectrum provided by the source 10 is assumed to extend from the frequency $F_1$ to $F_2$. The spectrum generated by the source 10 is supplied via a switch 11 and an isolating resistance 12 to the input of a 120° phase separator 13. The latter may be conventional per se, generating three spectra at its output in response to a single phase spectrum at its input, the three phase separated spectra being identical except that corresponding frequencies therein are at 120° phase separation. A suitable circuit for accomplishing this objective is disclosed in the above identified application for U.S. patent. The three outputs provided by the 120° phase separator 13 are applied via leads 14, 15 and 16, respectively, to a continuous phase shift modulator 17 of the type disclosed more specifically in the above identified application, and which has the function of shifting the input spectra in frequency by some fixed amount either positively or negatively, and providing at its output lead 18 a single spectrum containing the required frequency shift, to the exclusion of the input spectrum. The single frequency displaced spectrum is passed through a filter 19, and thence to a power amplifier 20 and an acoustic transducer 21. The filter 19 may preferably be an octaval filter, i.e., a filter having a pass band one octave wide. In accordance with the teaching of the above identified application, a suitable center frequency for the filter 19 may be 277 c.p.s. and the frequency shift introduced by the continuous phase shift modulator 17 may be 1 c.p.s. At the output of the filter 19 and between that output and the input of the 120° phase separator 13, is connected in cascade a unilateral feed-back circuit 22 and a phase shift vibrato modulator 23 (if desired) supplying the 120° phase separator via isolating resistance 24. The unilateral feed-back circuit 22 is arranged to be adjustable in respect to gain, and uniform in respect to its frequency versus phase shift characteristics and in respect to its amplitude versus frequency characteristic and may be so poled as to introduce positive or negative feed-back but of amplitude reduced with respect to the original signal applied to the 120° separator 13.

If then a given frequency F is applied to the input of the phase separator 13, it will be separated into three 120° phase separated signals of frequency F on the leads 14, 15 and 16, respectively. The continuous phase shift modulator 17 may raise the frequency by 1 c.p.s. to provide a new frequency on the lead 18, equal to $F+1$ c.p.s. The filter 19 is assumed to pass this frequency, which then passes through the unilateral feed-back circuit 22, is attenuated sufficiently to be smaller in amplitude than the original frequency F, and is then repassed through the system. Each passage through the system results in the addition of a further increment of frequency still higher than the previous 1 by c.p.s. but lower in amplitude. An adjustable time delay network 25 is introduced, in cascade with feed-back circuit 22, for purposes which will be explained hereinafter, as well as a switch 26.

Ordinarily feed-back of appreciable magnitude must be carefully inserted in a signal channel, so that continuous oscillations will not ensue. However, in the present case, for each input frequency there corresponds a new, higher or lower frequency in the output of the continuous phase changer. Since a portion only of the latter is fed back to the input of the phase changer, and since a different signal frequency is produced for each feed-back traverse, so that input and output frequencies are different, continuous oscillation cannot develop, whether the feed-back is positive or negative.

The feed-back network is required to be unilateral so that signal flow can occur only from the output to the input of the continuous phase changers, via the external path. The gain of the feed-back network is required to be somewhat less than the gain of the direct channel containing the continuous phase changer, so that each new output signal produced by successive loop traversals, will be of magnitude somewhat less than the input which gave rise to it. The maximum gain of elements 13, 17, 19 is however unity, so that any passive feed-back network will achieve the desired freedom from self-oscillation.

By introducing a time delay device 25 in the feed-back network, each frequency passing through filter 19 is regenerated at a new frequency position only after a time interval, during build up of response of the system, immediately after closure of switch 11. A discrete delay network may be unnecessary if adequate delay is inherent in the loop. This corresponds with glissando effect, like a Hawaiian guitar, if the continuous phase changer 17 introduces a positive frequency shift, and like an organ pipe with a flat going transient for negative frequency shift. It follows that in addition to the enrichment of tones which is possible by means of the present system, during steady state conditions, certain special transient effects are possible by manipulation of the switch 11.

Figure 2:
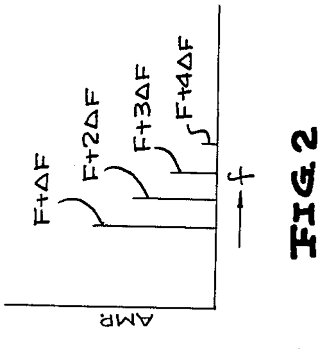
FIGURE 2 is a plot of amplitude versus frequency showing the steady state character of the output spectrum of the system in FIGURE 1 in response to a single input frequency.

Referring now to FIGURE 2 of the drawings, a single frequency F is inserted into the system and the results accomplished by successive traversals of the signal through the system are plotted. Assuming that the initial signal is at F c.p.s. and that a $\Delta F$ frequency shift in the positive sense is introduced, the output of the system at the first traversal is $F+\Delta F$ c.p.s., at the second traversal the $F+\Delta F$ c.p.s. signal remains at its original amplitude, but an $F+2\Delta F$ c.p.s. signal has been introduced, of slightly lower amplitude. On the third traversal of the signal still another frequency equal to $F+3\Delta F$ c.p.s. is introduced, which is still lower in amplitude than the signal of frequency $F+2\Delta F$ c.p.s. The process continues until the fedback signal is essentially incapable of further reproducing itself, because it has descended into the noise level. On opening of the switch 11 on the other hand, as time proceeds the lowest frequencies are eliminated first, to provide a sharp-going glissando effect.

The effect of opening and closing the switch 11 finds its parallel in operation of the key switches of an electronic organ, so that as the keys are depressed and raised in the playing of a musical composition, each tone, responsive to each key, gradually acquires a chorus effect on depression of the key, which decays on releasing the key. Each build up and decay requires time, following manipulation of the key, so that the effect is similar to that introduced by a reverberation mechanism or network. By varying the total attenuation in the feed-back network, the reverberation effect may be accentuated or reduced, i.e., for a large amount of feed-back, reverberation time will be considerable and also the total number of new frequencies introduced will be increased, while for small amounts of feed-back only a few new frequencies will be introduced and reverberation time will be reduced.

By introducing a large time delay (about 10 milliseconds) as by network 25, a considerable time may be required to introduce full chorus effect, while for negligible delays the effect will be almost instantaneous.

The phase shift vibrato circuit 23 achieves a periodic frequency variation of fed-back signals. This disperses the frequencies which correspond with chorus effect, as a function of time, and adds to the musical interest. An exemplary circuit 23 may be found in U.S. Patent 2,845,598, issued July 29, 1958, to Albert Meyer.

The inclusion of switch 26 permits the addition of chorus effect on a transient basis while the main spectrum is being transduced, i.e., assuming an input frequency from source 10 at F c.p.s., $F+F$ c.p.s. will be continuously transduced, and $F+2F$, $F+3F$, etc. can be added or deleted at will.

The sequence of events which occur on opening and closing of the switch 11 is illustrated in FIGURES 3*a* to 3*g* of the accompanying drawings, wherein time proceeds vertically downward. On closing the switch 11, and assuming that the continuous phase shift modulator 17 introduces a three c.p.s. reduction in frequency, and that a 1,000 c.p.s. per second input is applied to the system, the output of the system will initially be 997 c.p.s., as shown in FIGURE 3*a*. This frequency will feed back through the unilateral feed-back circuit 22, to the input of the 120° phase separator 13, and upon passing through the continuous phase shifter 17 will provide a frequency of 994 c.p.s. This is illustrated in FIGURE 3*b*, wherein the relative amplitudes of the component frequencies at 997 c.p.s. and 994 c.p.s. is explained by the fact that the amplifier loop including unilateral feed-back network 22 has a gain of less than unity. The time delay between the events indicated in FIGURES 3*a* and 3*b* may be about 10 milliseconds. The 994 c.p.s. component feeds back through the loop and generates a further component at 991 c.p.s. and the latter in turn generates a component at 988 c.p.s., the latter additions being illustrated in FIGURES 3*c* and 3*d*. The process continues indefinitely until no feed-back can occur because the fed back signal is below the noise level of the system. Upon opening the switch 11 the frequency at 997 c.p.s. disappears first, since this derives from the input frequency at 1,000 c.p.s. without delay, i.e., without storage in the system. There remains in the system 997 c.p.s. in the feed-back loop, since this element of the circuit includes storage, but the 997 c.p.s. frequency no longer appears at the amplifier 20. The 994 c.p.s. component next disappears because there is no longer any 997 c.p.s. component to feed-back through the loop. Similarly, the 991 c.p.s. component disappears next and eventually the 988 c.p.s. component disappears. Accordingly, on opening the switch 11 the frequencies illustrated in FIGURE 3*d*, which all present while the switch 11 was closed, disappear in sequence, exactly as they originally appeared, the sequence being illustrated in FIGURES 3*e*, 3*f* and 3*g*. Subjectively this is heard as a continuous decrease in frequency since the center line of the spectrum being transduced follows the dotted line 27, and accordingly shifts to the left or in the direction of decreasing frequency. In summary, on closing the switch 11 the average frequency transduced by the system proceeds to the left, i.e. in the direction of decreasing frequency, and on opening of the switch 11 proceeds still further to the left. There is, therefore, an apparent drop in frequency when the switch is closed and a further drop in frequency when the switch is opened on the assumption that the continuous phase shift modulator 17 introduces a decrease in frequency. Obviously, for an increase in frequency the opposite sequence of events would occur, i.e. on closing the switch 11 an apparent rise in frequency would take place, and on thereafter opening the switch 11 a further rise would take place. This effect has previously been referred to as "glissando," whether sharp or flat going.

Incorporation of the system of FIGURE 1 in a practical organ is illustrated in FIGURE 4 of the accompanying drawings, the system being specifically illustrated in terms of two tone generators 30 and 31, on the basis that the extension of the sysem to a complete elecronic organ will thereby be obvious to persons skilled in the art.

In the system of FIGURE 4 the tone generators 30, 31 are connected via gradual contact switches 32, 33 respectively to a tone bus 34. The tone bus 34 is connected in cascade with tone color or formant filters 35, which may be selected at will in conventional fashion. The output of the tone color or formant filters 35 proceeds via a switch SW1 and an isolating resistance 37 to a system of single-side-band, carrier-suppressed modulators 38, which has the function of introducing sharp going shifts in frequency for all the frequencies of any spectrum applied thereto, the extent of the sharp going modulation being successively greater in higher octaves of the complete audio spectrum. The modulator 38 is accordingly that illustrated and described in detail in the above referred to Wayne application, of which the present application is a continuation-in-part. The output of the modulator 38 is applied via an isolating resistance 39 to an output terminal 40, to which may be connected an audio amplifier 41 and a transducer 42, in cascade. The output of the tone color or formant filters 35 also proceeds via a switch SW2 and an isolating resistance 43 to a further frequency shift modulator 44, which introduces flat going effects in distinction to the modulator 38, which introduces sharp going effects. As in the above identified Wayne application, successively higher octaves of the wide band frequency spectrum representing music are frequency shifted to greater extents, so that the total frequency shift for any octave is approximately proportional to the frequency position of that octave within the audio spectrum. The output of the modulator 44 is applied via an isolating resistance 45 to the output terminal 40.

Accordingly, by closing switch SW1 the musical output available on the bus 34 may be raised sharp and by closing the switch SW2 may be made flat, whereas by closing both switches both a sharp and a flat effect may be achieved simultaneously. Connected around the modulator 38 is a unilateral feed-back network 50 similar to that illustrated in FIGURE 1 of the accompanying drawings, i.e., including a delay network and a phase shift vibrato modulator, which may be adjustable so that either delay, or extent of feed-back, or frequency or extent of frequency shift introduced by the vibrato modulator may be adjusted to suit the musician.

The feed-back network 50 is connected to the input of the modulator 38 through two resistances in series, these being identified by the reference numerals 51 and 52. The resistance 51 is made variable, to enable adjustment of the gain of the feed-back loop, while the junction of the resistances 51, 52 is connected via a lead 53 and a switch 54 to a bus 55. Similarly, a feed-back network 56 is provided which extends between the output and the input of the modulator 44, and which includes in series two resistances 57, 58. The resistance 57 is made variable to enable variation of gain of the feed-back network, and to the junction of the two resistances is connected a lead 59 in cascade with the switch 60, and which proceeds to a bus 61. Feed-back networks 50 and 56 may be identical.

The bus 55 is connectable to ground through switches B1, B2, etc., there being one switch for each tone generator as 30, 31, and there being a relatively small resistance R1 in series with the switch B1, a small resistance R2 in series with the switch B2, and so on. Similarly, the bus 61 is connectable to ground through switches C1, C2, etc., and via resistances R1′, R2′, etc., there being one switch and one resistance associated with each tone generator, as 30, 31. The switches B1, C1, for example, are coupled with the gradual switch 32, so that after the gradual switch 32 has achieved partial closure, the switches B1, and C1 will close completely, and will open again before the switch 32 has achieved a completely open position. The switches 54 and 60 are ganged to a common operator 62, which may in a practical organ be a toe stud.

Describing now the operation of the system of FIGURE 4 operation may take place with either switch SW1 closed or SW2 closed, or with both SW1 and SW2 closed. Assuming that SW1 is open and SW2 is closed, on depressing a key, a gradual switch, as 32, for example, is activated and initially signal is applied from generator 30 to bus 34, and via bus 34 through tone color filters 35, and thence to the modulator 44, which introduces in succession flat going choral spectra because of the inclusion of the feed-back network 56, and pursuant to the chain of operations indicated in FIGURES 3*a*, 3*b*, 3*c*, and 3*d*.

After the switch 32 has achieved a predetermined closure, the switch C1 closes, which has the effect of partially by-passing the fed-back signal to ground via a resistance R1′, and therefore reducing the gain of the feed-back network. So long as the key remains depressed, the feed-back network 56 is rendered relatively ineffective, or, if the resistance R1′ is chosen of sufficiently small magnitude, is substantially disabled. On releasing the key however, the switch C1 opens first, re-introducing the feed-back network, so that the series of frequencies at FIGURES 3*a* to 3*d* inclusive, is generated, and thereafter upon completion of raising of the key, so that switch 32 opens, the sequence of frequencies indicated at FIGURES 3*e*, 3*f* and 3*g* take place, so that a flat going effect may be produced on termination of each note, providing another key has not previously been depressed.

By opening the switch SW2 and closing the switch SW1 on the other hand, a sharp going glissando effect may be achieved at the termination of each note, i.e., when the key pertaining thereto is raised, provided another key has not been previously depressed.

On closure of both switches SW1 and SW2 the modulators 38 and 44 are both included in the system, so that there exists a simultaneous flat going and sharp going effect. The average frequencies produced during closure of switches 32, B1, and C1 is then the same as generator 30; i.e., the flat going effect subjectively balances out the sharp going effect, and there is no longer an impression of either a flat going effect or a sharp going effect, but the enrichment of the audio spectrum on a progressive basis provides a chorus effect. Upon opening normally-closed switches 54, 60 by means of the actuator 62 the effect of all switches $B_i$, $C_i$ is disabled, and the feed-back networks 50, 56 are fully operative at all times. Thereby, maximum reverberative effect can be obtained at the end of a musical phrase, if the musician depresses the "sustaining" toe stud 62.

If the $R_i$ and $R_i'$ equal zero ohms, a plucked string effect with no gradual decay will be produced except for the final chord. The $R_i$ and $R_i'$ can be of different values throughout the keyboard compass. For low notes, for example, the $R_i$ and $R_i'$ should be large to produce a long decay time. For high notes, the $R_i$ and $R_i'$ should be relatively less in value.

The switches 54, 60 which are normally closed, take precedence over the manually operated switches $B_i$, $C_i$ and are utilized if the musician desires to have more ringing during the playing of a legato passage. By legato in this connection it is meant that at least one key is depressed at all times, since under these conditions the feed-back circuits are disabled or relatively reduced in effectiveness at all times. The role of these $R_i$ and $R_i'$ resistors also permits better definition while playing "thick" chords or multi-varied polyphony, since they reduce the reverberation time during intervals of legato playing yet permit the last-played chord to "ring" with a desirably long reverberation time.

Glissando, sharp going or flat going and reverberatory effects are achieved only at the terminations of key depressions which are discrete, so that the musician can achieve the various types of effects provided by the invention, according to the manner of his playing, i.e., he can suppress the effects by playing legato and introduce them by playing staccato. He can also introduce particularly rich chorus effects by depressing keys partially, so as to avoid closure of switches $B_i$, $C_i$, and of course can select among the effects, or disable switches $B_i$, $C_i$ by manipulation of switches $SW_1$, $SW_2$, 54 and 60.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a musical system, a source of carrier signal having a broad frequency spectrum, a single-side-band carrier-suppressed modulator for shifting the frequencies of said spectrum and having an input circuit and an output circuit, said source being connected to said input circuit, and a feed-back circuit coupling said output circuit to said input circuit to feed the frequency shifted spectrum to said input circuit.

2. The combination according to claim 1 wherein said feed-back circuit introduces time delay.

3. The combination according to claim 1 wherein said feed-back circuit is unilateral.

4. In a musical system, a source of a broad audio frequency spectrum carrier, a frequency modulator in cascade with said frequency spectrum for frequency modulating said spectrum, said frequency modulator having an input circuit connected to said source and an output circuit, a feed-back circuit coupling said output circuit to said input circuit, and an acoustic transducer connected in cascade with said frequency modulator.

5. In a musical system, a source of a broad audio frequency spectrum carrier, a carrier-suppressed modulator having an input circuit and an output circuit, means connecting said source to said input circuit, a feed-back means connecting said output circuit to said input circuit, and an acoustic transducer connected in cascade with said modulator.

6. In a system for processing audio spectra, a single-side-band, carrier-suppressed modulator having an input circuit and an output circuit, a feed-back network having predetermined gain connected between said output circuit and said input circuit, a source of an audio spectrum, key-operated means for coupling said spectrum source to said input circuit, and means operable only between partial and full depression of said key for reducing the gain of said feed-back circuit.

7. In a system for processing audio spectra, a generator for a tone signal, a first frequency shift modulator arranged to shift the frequency of a tone signal sharp, a second frequency shift modulator arranged to shift the frequency of a tone signal flat, a key-operated switch for connecting said generator to both said first and second frequency shift modulators, each of said frequency shift modulators having an input circuit and an output circuit, and a separate feed-back circuit interconnecting the output circuit of each of said frequency shift modulators with the input circuit thereof.

8. The combination according to claim 7 wherein is provided key operated means for reducing the gain of said feed-back circuit in response to partial depression of said key.

9. In a system for processing audio tone signals, a carrier-suppressed modulator having a carrier input circuit for connection to a source of said audio tone signals, and having an output circuit, and a feed-back circuit connected between said output circuit and said input circuit.

10. In combination, a source of an audio frequency carrier spectrum of electrical signals, a frequency shift modulator in cascade with said source, said frequency shift modulator being of the single-side-band, carrier-suppressed type, a feed-back circuit for feeding back frequency shifted audio frequency signals from the output to the input of said frequency shift modulator, said frequency shift modulator being arranged to introduce a sub-audio frequency shift, said frequency shift modulator and said feed-back circuit forming a loop having a gain of less than unity.

11. An electronic organ, comprising, a plurality of tone generators, a tone bus, a gradual switch connected between each of said tone generators and said tone bus, a separate further switch associated with each of said gradual switches and arranged to close in response to partial closure of its associated gradual switch, a common switch bus, each of said further switches having a first and a second terminal, said second terminals being all connected to said common switch bus, circuit means connecting each of said first terminals to a point of reference potential, tone color filters connected in cascade with said tone bus, a frequency shift modulator of the carrier-suppressed, single-side-band type connected in cascade with said tone color filters, a feed-back network connected from output to input of said frequency shift modulator, and a connection from said feed-back network to said switch bus, said connection being arranged to reduce gain of said feed-back network on closure of any one of said further switches.

12. The combination claimed in claim 11, including switching means in series with said further switches and said feed-back networks, said switching means being capable of taking precedence over said further switch, whereby a sustaining effect is achieved.

13. The combination claimed in claim 12, wherein said switching means is operable by a toe stud.

References Cited in the file of this patent

UNITED STATES PATENTS

| | | |
|---|---|---|
| 2,697,816 | Weaver | Dec. 21, 1954 |
| 2,916,706 | Timperman | Dec. 8, 1959 |
| 3,000,252 | Wayne | Sept. 19, 1961 |
| 3,002,161 | Feryszka | Sept. 26, 1961 |
| 3,004,459 | Jones | Oct. 17, 1961 |
| 3,004,460 | Wayne | Oct. 17, 1961 |
| 3,007,361 | Wayne | Nov. 7, 1961 |